Sept. 24, 1946.   W. F. EAMES   2,408,203
MOVING STAIRWAY
Filed Dec. 30, 1942   2 Sheets-Sheet 1

WITNESSES:

INVENTOR
William F. Eames.
BY
ATTORNEY

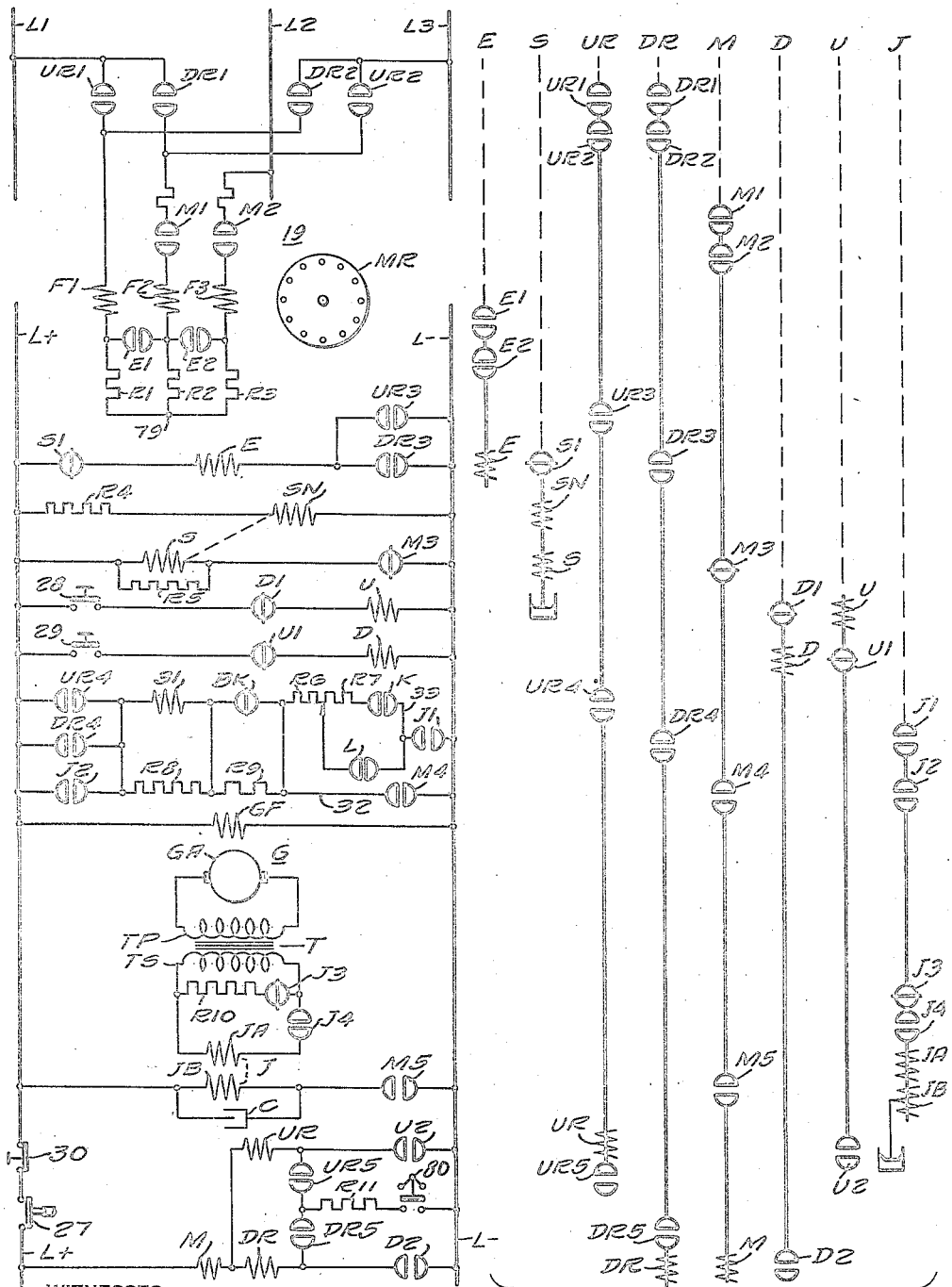

Patented Sept. 24, 1946

2,408,203

UNITED STATES PATENT OFFICE 2,408,203

MOVING STAIRWAY

William F. Eames, Westfield, N. J., assignor, by mesne assignments, to Westinghouse Electric Corporation, East Pittsburgh, Pa., a corporation of Pennsylvania Application December 30, 1942, Serial No. 470,657

10 Claims. (Cl. 188—172)

My invention relates to moving stairways in which the moving steps are operated by endless gear chains disposed on a plurality of sprocket wheels and, more particularly, to the control systems and safety devices for such steps.

One object of my invention is to provide means for so controlling the deceleration of moving stairways as to keep it at a predetermined safe rate of retardation.

Another object is to so control the deceleration of moving stairways as to keep it at a predetermined rate of retardation regardless of direction of operation, loading or brake setting.

A further object is to provide a means for insuring the stopping of a stairway in the event that the decelerating control means fails to operate.

Other objects of the invention will be apparent from the following description taken in conjunction with the accompanying drawings, in which:

Fig. 3 is a straight-line diagram of the control system for the stairway; and

Fig. 3A is a key representation of the relays used in Fig. 3, with their coils and their contact members disposed in horizontal alignment with their locations in the straight-line diagram. The following relays are included in the system:

Figure 1:
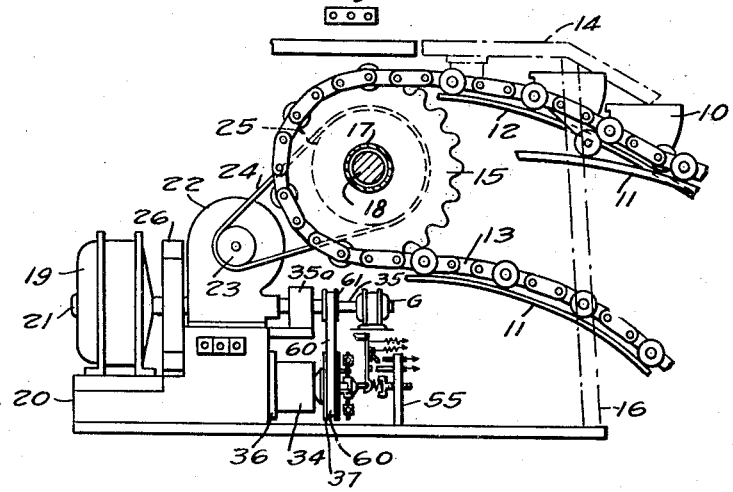
Figure 1 is a view in side elevation of the driving mechanism for a moving stairway embodying my invention.
Figure 2:
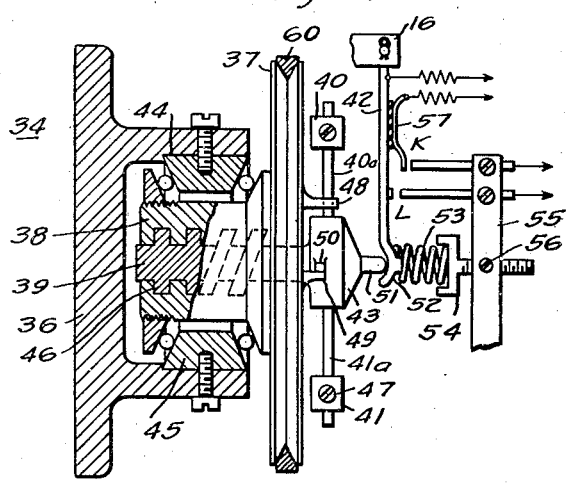
Fig. 2 is a view, partly in section and partly in side elevation, of the centrifugal switching device operated by the stairway driving mechanism for use in controlling the retardation of the stairway.

U=up direction switch
D=down direction switch
UR=up direction relay
DR=down direction relay
M=running relay
E=accelerating relay
S=time delay relay
J=brake control relay Referring more particularly to the drawings, I have illustrated the driving portion of a moving stairway as including an endless series of movable steps 10, disposed to be operated along their tracks 11 and 12 by a pair of gear chains 13, between an upper landing 14 and a lower landing (not shown). The gear chains are supported at the upper landing by driving sprocket wheels 15 and at the lower landing by suitable sprocket wheels (not shown). A suitable truss or frame represented by the part 16 is provided for supporting the stairway and its driving mechanism. The driving sprocket wheels 15 are mounted upon and supported by a suitable torque tube 17 disposed upon a suitable axle 18, the outer ends of which may be supported in any suitable bearings (not shown).

A motor 19 mounted on a bed plate 20 is provided for driving the sprocket wheels 15 through a driving shaft 21, a reduction gear 22, a driving pinion 23, a driving chain belt 24 and a driving sprocket wheel 25. The sprocket wheel 25 is fixed on the torque tube 17 so that the sprocket wheels 15, which are also fixed on the tube, will be rotated by the operation of the sprocket wheel 25.

A service brake 26 is provided for the motor shaft 21 for the purpose of stopping the motor and the stairway when desired or when safety devices (not shown) operate to open a safety switch 27 (Fig. 3). The brake 26 is a spring applied electromagnetically released brake such as is usually associated with electric motors. A brake of this character is illustrated and described in the G. A. Halfvarson Patent 1,902,640 issued March 21, 1933 to which reference may be had for more particular details, if desired.

The motor 19 is illustrated in Fig. 3 as an alternating current squirrel cage motor provided with a rotor MR and field windings F1, F2 and F3. A plurality of supply conductors L1, L2 and L3 are provided for connecting the motor to a suitable source of electrical energy, and a plurality of resistors R1, R2 and R3 are disposed in the motor circuit for controlling its speed.

The control system is designed for operation by a direct current source of supply to which it may be connected by the supply conductors L+ and L−.

The energization of the motor 19 is controlled by the car running relay M. Its direction of operation is controlled by the up direction relay UR and the down direction relay DR, which are, in turn, controlled by the up direction switch U and the down direction switch D.

The stairway may be started for up operation by pressing an up button 28 to energize the up direction switch U and it may be started for down direction operation by pressing a down button 29 for energizing the down direction switch D. The stairway may be stopped by pressing a stopping button 30 for deenergizing the up direction relay UR, the down direction relay DR and the running relay M. The safety switch 27 may be controlled by any well known safety device (not shown) and is provided for stopping the stairway by opening the circuit to the relays UR, DR and M.

The speed of the motor is controlled by the accelerating relay E for connecting and disconnecting the resistors F1, F2 and F3 in the circuit of the field windings of the motor. A time delay relay S is used for delaying the operation of the accelerating relay E for a predetermined period after the motor is first energized to start, so that the resistors will not be disconnected from the motor until it starts. The relay S has a neutralizing coil SN which causes delay in its opening when its coil is deenergized, but any other suitable time delay relay may be used.

A magnetizing coil 31 is provided for controlling the brake. The coil is controlled through a main circuit 32 by the up direction relay UR, the down direction relay DR and the car running relay M in such manner that it is energized to release the brake as soon as the running relay and one of the direction relays are energized to start the stairway, and deenergized to stop the stairway when the motor is deenergized. A discharge resistor R8 is connected around the brake coil to control its flux decay when it is disconnected from its circuit. A series resistor R9 is disposed in the brake circuit to be controlled by a brake switch BK. When the brake coil is energized and the brake operates, the opening movement of the brake operates the switch BK to insert the resistor R9 in series with the brake coil to prevent overheating.

In order to control the rate of deceleration of the stairway and hold it to a predetermined safe rate when it is being stopped by the action of the brake, I have provided an auxiliary control circuit 33 for the brake coil to be operated by a brake control relay J and an inertia operated switching device 34.

The brake control relay J is provided for connecting the auxiliary control circuit 33 to the brake coil when the brake is to be controlled during deceleration of the stairway to a stop. The relay is provided with two coils JA and JB. The coil JB is disposed to be connected across the supply conductors by the car running relay M while the stairway is in operation and to be disconnected only while the stairway is standing still. The coil JA is connected in circuit with the secondary coil TS of a transformer T. A condenser C is connected around the coil JB to delay the opening of the relay for a predetermined period of time, say, .3 of a second, after it becomes deenergized.

The primary coil TP is connected for energization by the armature GA of a tachometer or direct current generator G. The generator is provided with a field winding GF which is connected across the supply conductors L+ and L— for constant energization. The armature GA of the generator is mounted for operation on a shaft 35 extending from the shaft 21 so that it will be rotated in accordance with the speed of the stairway motor. A gear shifting device 35a connects the shaft 35 to the shaft 21 so that the armature GA will be rotated in the same direction at all times regardless of the direction of operation of the stairway motor.

The generator generates a voltage when the stairway is running which circulates a current in the primary winding TP thereby storing energy in the magnetic field of the transformer. Inasmuch as this is direct current, no voltage will appear in the secondary winding TS as long as the generator is generating a steady current as it is operated at constant speed by the constant speed of the stairway. If the stairway is retarded, the speed of the generator is decreased. Inasmuch as it is a direct-current generator, the decrease in voltage in the primary winding will tend to collapse the transformer field, thereby generating a voltage in the secondary winding which will circulate a current in the coil JA of the relay J and thus prevent that relay from dropping out after the time delay of its coil JB expires. The current in the secondary winding will cause the coil JA to maintain relay J in its energized condition thereafter while the stairway is decelerating until it comes to rest.

Therefore, it is seen that the relay J and the tachometer generator cooperate to connect the auxiliary control circuit 33 with the brake coil and the supply conductors L+ and L— when the stairway starts and to maintain it connected therewith while the stairway is decelerating to a stop.

The brake control circuit includes two resistors R6 and R7 which are manipulated by the inertia device 34 to control the strength of the brake during deceleration of the stairway to a stop so as to secure a predetermined safe rate of deceleration.

The inertia device 34 comprises a base or frame 36, a sheave or belt wheel 37 having a hub 38 extended at its one side, a shaft 39 with a screw-threaded end, a pair of inertia weights 40 and 41, and a switch arm 42 having its upper end pivotally attached to the frame 16. The frame 36 is mounted on and supported by one side of the bed plate 20. A recess 44 is provided in the frame 36 for receiving and holding a ball bearing 45 which rotatably supports the hub 38 of the wheel 37. The axial center of the hub is provided with a screw-threaded recess 46 in which the left-hand end of the screw-threaded shaft 39 is seated and supported. The right-hand portion of the shaft 39 extends through the center of the wheel 37 and is provided with a head 43 upon which the centrifugal weights 40 and 41 are mounted by means of weight rods 40a and 41a. The weights are secured on the rods by adjusting screws 47. A pair of projecting lugs 48 and 49 extend from the right-hand side of the wheel 37. A cooperating boss 50 extends radially from the shaft head 43 so that the parts may be assembled with the boss disposed in the space between the lugs. The lugs 48 and 49 are spaced apart sufficiently to permit a limited angular motion of the shaft in the wheel.

An axial pin 51 extends from the right-hand end of the shaft head in position to engage the free end of the switch arm 42, the opposite side of which is provided with a spring seat 52 disposed to receive one end of a compression spring 53, the other end of which is disposed in a spring seat 54. The spring seat 54 is mounted on a screw-threaded shank seated in an arm 55 on the frame 36, so that the pressure of the spring 53 will bias the shaft 39 to its innermost position in the hub 39. The amount of compression in the spring 53 may be adjusted to any value desired by rotating the shank and fixing it in the desired position by a setscrew 56.

A pair of open switches K and L for controlling the resistors R6 and R7 in the brake control circuit are mounted on the switch arm 42 and the arm 55. One of the contacts of the switch K is supported on the switch arm 42 by means of a leaf spring 57 in position to close before the switch L when the switch arm is moved in its switch-closing direction.

The sheave 37 is designed to be driven at a speed of rotation proportional to the speed of the stairway. One means for doing this is illustrated as a belt 60 disposed in the grooved periphery of the sheave and extending around a pulley 61 on the shaft 35 connected with the main driving shaft 21 by means of the gear shift 35a. Thus the sheave 37 as well as the generator G will be operated continuously in one direction in accordance with the speed of the stairway regardless of the direction of operation of the stairway.

In the present instance the gear shift 35a is adjusted to cause the pulley and belt to rotate the sheave 37 in a clockwise direction when viewed from the right. Rotation of the sheave in this direction during its acceleration and its normal running speed will cause the arm 49 to engage the lug 50 and thereby rotate the shaft 39 in the same direction and carry the weights 40 and 41 around with it. When the stairway is running at its normal speed or slowing down at the desired normal rate of deceleration, the spring 53 will maintain the shaft 39 into its normal position in the hub 38. If the stairway is decelerated too rapidly, the stored energy in the inertia weights will act to continue the rotation of shaft 39, thus unscrewing it from the hub against the biasing effect of the spring 53. If the rate of deceleration is beyond the rate for which the inertia weights and spring are set, the shaft 39 will be moved outwardly sufficiently to cause the switch arm to close first the switch K and then, if the rate of retardation increases, cause it to close the switch L. If the rate of deceleration decreases, the spring 53 will return the shaft 39 to its normal position, thus opening the switches K and L.

*Assumed operation of stairway*

In assuming an operation of the stairway, it will be assumed that the conductors L+ and L— are connected to a source of energy, thus energizing the time delay relay S and the generator field winding GF. It will be assumed also that an attendant presses the down button 29 to start it for down operation. The pressing of the down button 29 energizes the down direction switch D by the circuit,

L+, 29, U1, D, L—

The energized down direction switch D opens its interlocking contacts D1 and closes its starting contacts D2. The closing of the contacts D2 energizes the down direction relay DR and the running relay M by the circuit,

L+, 30, 27, M, DR, D2, L—

The energized relay DR closes its contacts DR1, DR2, DR3, DR4, and DR5. The energized relay M closes its contacts M1, M2, M4 and M5 and opens its contacts M3.

The closing of the contacts DR1 and DR2 and the contacts M1 and M2 energizes the field windings F1, F2 and F3 of the driving motor 19 to start the stairway downwardly, by the circuit, L1, DR1, M1, F2, R2 to a point 79;
L2, M2, F3, R3 to the point 79; and
L3, DR2, F1, R1 to the point 79.

The motor 19 is now energized to start the stairway downwardly. The closing of the contacts DR4 and M4 energizes the brake coil 31 by the circuit,

L+, DR4, 31, BK, M4, L—

The energized brake coil releases the brake 26 and the stairway starts its down movement. As the brake moves from its "on" position to its "off" position, it opens the brake switch BK and thereby inserts the resistor R9 in series with the brake coil 31 to prevent overheating of the coil while the brake is held in its released position.

The opening of the contacts M3 deenergizes the coil S. However, the neutralizing coil SN on the relay S delays the deenergized operation of the relay S for a short period. As soon as this delay expires, the relay S closes its back contact S1 and thereby energizes the accelerating relay E by the circuit

L+, S1, E, DR3, L—

The energized relay E thereby closes its contacts E1 and E2 in the field winding of the motor 19, and thus short-circuits the resistors R1, R2 and R3 thereby increasing the speed of the motor 19 to its normal running speed.

The closing of the contacts DR5 prepares a self-holding circuit for the relay DR extending through the resistor R11. As the motor reaches its normal down speed, the contacts of a governor switch 80 close, thus completing the self-holding circuit for relay DR. The down start switch 29 must be held closed by the attendant when the motor is started until its acceleration to its normal running speed closes the governor switch 80.

The closing of the contacts M5 energizes the coil JB of the relay J by the circuit,

L+, JB, J, M5, L—

The energized relay J closes its contacts J1, J2 and J4 and opens its contacts J3. The closing of the contacts J1 and J2 prepares the brake control circuit 33 for operation by connecting its outer ends to the supply conductors L+ and L—. The brake control circuit 33 has no effect on the brake coil 31 while the stairway is running at normal high speed. It will come into use only when the stairway is decelerated through a stop and then only when the rate of deceleration or retardation is too rapid for safety. The opening of the contacts J3 eliminates the resistor R10 from its circulatory circuit with the secondary winding TS and the closing of the contacts J4 connects the secondary winding TS with the coil JA of the relay J.

The motor 19 rotates the shaft 21, thus rotating the shaft 21 and operating the chain belt 24 to rotate the sprocket wheel 15. The operation of the sprocket wheel 15 operates the driving chain 13 to move the steps 10 downwardly on the working face of the stairway at its normal running speed.

The rotation of the shaft 21 also operates the gears 35a to rotate the shaft 35 as well as the pulley 61 thereon and the armature GA of the tachometer generator G. The rotation of the pulley 61 operates the belt 62 to rotate the sheave 37 in clockwise direction as viewed from right of the sheave. The rotation of the sheave 37 causes its lug 49 to engage the boss 50 on the head 43 and thereby rotate the shaft 39 with the sheave and at the same speed. The rotation of the head 43 carries the weights 40 and 41 around with the sheave and at the same speed as that of the sheave, thus storing energy in the weights.

The rotation of the armature GA at constant speed supplies a constant voltage to the transformer but inasmuch as the generator is a direct current generator, no current is induced in the secondary winding TS.

It will be assumed now that the car attendant presses the stop switch 30 or that a sudden operation of one of the safety devices opens the switch 27, thus deenergizing the down direction relay DR and the running relay M to stop the stairway. The deenergized relay DR opens its contacts DR1, DR2, DR3, DR4 and DR5. The deenergized relay M opens its contacts M1, M2, M4 and M5 and closes its contacts M3. The opening of the contacts DR1 and DR2 deenergizes the driving motor 19. The opening of the contacts M4 deenergizes the brake coil 31 which applies the brake 26 to bring the stairway to a standstill.

The closing of the back contacts M3 reenergizes the time delay relay S which opens its contacts S1 thus deenergizing the accelerating relay E to prepare it for the next start.

The opening of the contacts M4 also leaves the brake coil 31 under the control of the auxiliary circuit 33 which is connected to the supply conductors L+ and L— through the contacts J1 and J2. The opening of the contacts M5 deenergizes the coil JB but the conttacts J1 and J2 remain closed, because, when the stairway motor 19 started to decelerate, it decreased the speed of the generator G and thereby decreased the voltage in the primary winding TP of the transformer T, thus collapsing the magnetic field of the transformer and thereby generating a voltage in the secondary winding TS of the transformer. The induced voltage in the secondary winding TS energizes the coil JA of the relay J. This takes place before the relay J can open its contacts J1 and J2, by reason of the time delay of, say .3 second caused by the condenser C across the terminals of the coil JB. The energized coil JA now keeps the relay J in energized condition.

It will be assumed now that the brake 26 is applied to the stairway motor so strongly that it decelerates at a rate so rapid as to be dangerous and which exceeds the predetermined safe rate for which the inertia device is adjusted. This excessive rate of deceleration retards the shaft 21 and hence the shaft 35, the pulley 61, the belt 60 and the sheave 37 to such a degree that the energy stored up in the inertia weights 40 and 41 causes them to travel faster than the sheave 37, thereby rotating the shaft 39 faster than the hub 38 and unscrewing it from the hub against the action of the spring 53.

The unscrewing movement of the shaft 39 in the hub 38 moves it to the right and thus causes the pin 50 to move the free end of the switch lever 42 outwardly against the compression spring 53. As this movement takes place, the switch K is closed, thus closing its contacts in the brake control circuit and thereby completing a circuit for energizing the brake coil 31 to a predetermined degree sufficient to soften the brake against the shaft 21. This circuit extends

L+, J2, 31, BK, R6, R7, K, J1, L—

Thus it is seen how retardation of the stairway at a predetermined excessive rate of retardation reduces the braking effect of the brake 26 by a predetermined energization of the brake coil 31 so as to decrease the rate of retardation of the stairway.

It will be assumed now that the rate of deceleration of the stairway, instead of being decreased sufficiently by the action of the brake, increases still further, thus causing the sheave 37 to slow down at a still higher rate of deceleration so that the inertia weights 40 and 41 cause the shaft 39 to move still farther out of the sheave hub and thereby press the brake lever 42 outwardly still farther to the position where the switch L closes its contacts. The closing of the contacts L short circuits the resistor R7 in the brake control circuit, thus further energizing the brake coil 31 to such an extent as to decrease the braking effect still further. The circuit through the brake coil now extends:

L+, J2, 31, BK, R6, L, J1, L—

By this arrangement it is seen that a too rapid rate of retardation of the stairway beyond the predetermined safe rate reduces the braking effect so that the rate of retardation of the stairway decreases until the stairway resumes its safe rate of retardation.

The generator G and the cooperating relay J serve the additional purpose of providing a means which will insure the setting of the brake in case the auxiliary control circuit fails by reason of its releasing-contacts sticking or for any other reason.

It will be assumed now that, during a stopping operation, retardation of the stairway fails for some reason. Under such conditions, the speed of the generator G remains constant and consequently there is no collapse of the magnetic field of the transformer T. Hence after a short delay, the relay J becomes deenergized and opens its contacts J1, J2 and J4, and closes its contacts J3. The opening of the contacts J1 and J2 disconnects the brake control circuit from the supply conductors L+ and L—. This operation deenergizes the brake coil 31 and causes the brake to set at its maximum rate of retardation and thus brings the stairway to a prompt stop. The opening of the contacts J4 disconnects the coil JA from the secondary winding TS of the transformer T thereby preventing the relay J from being again energized during this stopping operation. The closing of the back contacts J3 inserts the resistor R10 in its circulatory circuit with the secondary winding TS as a discharge resistance to prevent excessive voltage across the transformer under the present conditions.

By the foregoing arrangement of apparatus and circuits it will be seen that I have provided a retardation control system which will prevent the stairway or any other movable body to which it is applied from being decelerated at an unsafe rate of retardation, and further, that if the brake control circuit becomes defective or fails to operate for any reason, then the operation of the generator G and the relay J disconnects the brake control circuit entirely from the brake system and deenergizes the brake coil so that the brake will effectively stop the stairway in response to either the operation of the safety switch 27 or the attendant operated stop switch 30.

Although I have illustrated and described only one specific embodiment of my invention, it is to be understood that modifications thereof and changes therein may be made without departing from the spirit and scope of the invention.

I claim as my invention:

1. In a control system for a movable body, an electric motor, an electromagnetic brake, control means for connecting and disconnecting the motor and the brake to a source of electric energy for starting and stopping the body, an auxiliary circuit for the brake, means responsive to operation of the control means in connecting the motor to be energized for preparing the auxiliary circuit for operation, mechanism automatically responsive to a decelerating movement of the body in making a stop for maintaining the auxiliary circuit in condition for operation, and means responsive to a predetermined excessive rate of deceleration for completing the auxiliary circuit to reduce the braking effect of the brake.

2. In a control system for a movable body, a motor for moving the body, an electromagnetic brake, a main circuit for the brake, a circuit for the motor, control means for connecting and disconnecting the motor circuit and the main circuit with a source of energy to start the motor and release the brake and to stop the motor and to apply the brake in operating the movable body, a decelerating control circuit for the brake, means responsive to operation of the control means for connecting the brake control circuit to the source of energy, mechanism automatically responsive to a decelerating movement of the body for maintaining the brake control circuit connected to the source of energy while the body is decelerating after the control means disconnects the motor from its source of energy, and means responsive only to a predetermined excessive rate of deceleration of the body for operating the brake control circuit to decrease the braking effect of the brake.

3. In a control system for a movable body, an electric motor, an electromagnetic brake, a main circuit for the brake, an auxiliary circuit for the brake, control means; means responsive to one operation of the control means for operating the motor to start the body, for connecting the main brake circuit to a source of electric energy for releasing the brake and for preparing the auxiliary circuit for operation, and responsive to another operation of the control means for deenergizing the motor and disconnecting the main brake circuit from its source of energy; mechanism automatically responsive to a decelerating movement of the body for maintaining the auxiliary brake circuit in preparation for operation after the control means disconnects the motor from its source of energy, and means responsive only to a predetermined excessive rate of deceleration of the body for operating the auxiliary circuit to reduce the braking effect of the brake until the body resumes its normal rate of deceleration.

4. In a control system for a movable body, an electric motor, an electromagnetic brake, a main circuit for the brake, an auxiliary circuit including a predetermined amount of resistance for the magnetizing coil of the brake, a brake control relay for preparing the auxiliary circuit for operation; means responsive to one operation of the control means for connecting the motor, the main circuit and the brake control relay to a source of electric energy, and responsive to another operation for disconnecting the motor, the main circuit and the brake control relay from their source of electric energy; a generator operable by the body, means responsive to a decelerating operation of the generator for maintaining the brake control relay in energized condition during deceleration of the body and thereby maintain the auxiliary circuit partially completed, and an inertia device responsive only to operation of the body at a predetermined excessive rate of deceleration for completing the auxiliary circuit to supply a predetermined amount of energy to the coil of the brake to thereby reduce the braking effect of the brake while the excessive deceleration continues.

5. In a control system for a movable body, an electric motor, an electromagnetic brake, control means for connecting and disconnecting the motor and the brake to a source of electric energy for starting and stopping the body, an auxiliary circuit for the brake, means responsive to operation of the control means in connecting the motor to be energized for preparing the auxiliary circuit for operation, means responsive to deceleration of the body in making a stop for maintaining the auxiliary circuit in condition for operation, means responsive only to a predetermined excessive rate of deceleration for completing the auxiliary circuit to reduce the braking effect of the brake, and means responsive to failure of deceleration of the body for rendering the auxiliary circuit ineffective in operation at any point in the travel of the body where such failure occurs.

6. In a control system for a movable body, an electric motor, an electromagnetic brake, a main circuit for the coil of the brake, an auxiliary circuit for the coil of the brake, control means; means responsive to one operation of the control means for operating the motor to start the body, for connecting the main brake circuit to a source of electric energy to release the brake and for preparing the auxiliary circuit for operation, and responsive to another operation of the control means for deenergizing the motor and disconnecting the main brake circuit from its source of energy, means responsive to deceleration of the body for maintaining the outer ends of the auxiliary brake circuit connected across a source of electric energy and ready for operation, means responsive only to a predetermined excessive rate of deceleration of the body for completing the auxiliary circuit to energize the brake and thereby reduce the braking effect of the brake until the body resumes its normal rate of deceleration, and means responsive to failure of the body to reach a predetermined rate of deceleration for disconnecting the auxiliary brake circuit from its source of electric energy at any point in the travel of the body where such failure occurs.

7. In a control system for a movable body, an electric motor, an electromagnetic brake, a main circuit for the brake, an auxiliary circuit including a predetermined amount of resistance for the magnetizing coil of the brake, a brake control relay for the auxiliary circuit; means responsive to one operation of the control means for connecting the motor, the main circuit and the brake control relay to a source of electric energy, and responsive to another operation for disconnecting the motor, the main circuit and the brake control relay from their source of electric energy; a transformer, a direct current generator operable by the body for providing a constant voltage to the transformer while the body is operating at constant speed and for providing a decreasing voltage to the transformer while the body is decelerating, a circuit connecting the transformer and the brake control relay for maintaining the brake control relay in energized condition during deceleration of the body and thereby maintain the auxiliary circuit partially completed, and an inertia device responsive to operation of the body at a predetermined excessive rate of deceleration for completing the auxiliary circuit to supply a predetermined amount of energy to the coil of the brake to thereby reduce the braking effect of the brake while the excessive deceleration continues.

8. In a control system for a movable body, an electric motor, an electromagnetic brake, a main circuit for the brake, an auxiliary circuit including a predetermined amount of resistance for the magnetizing coil of the brake, a brake control relay for the auxiliary circuit; means responsive to one operation of the control means for connecting the motor, the main circuit and the brake control relay to a source of electric energy, and responsive to another operation for disconnecting the motor, the main circuit and the brake control relay from their source of electric energy; a transformer, a direct current generator operable by the body for providing a constant voltage to the transformer while the body is operating at constant speed and for providing a decreasing voltage to the transformer while the body is decelerating, a circuit connecting the transformer and the brake control relay for maintaining the brake control relay in energized condition during deceleration of the body and thereby maintain the auxiliary circuit partially completed, an inertia device responsive to operation of the body at a predetermined excessive rate of deceleration for completing the auxiliary circuit to supply a predetermined amount of energy to the coil of the brake to thereby reduce the braking effect of the brake while the excessive deceleration continues, and means responsive to deenergization of the time delay relay for preventing its reenergization by the transformer during the same cycle of operation.

9. In a control system for a movable body, a motor, an electromechanical brake for decelerating and stopping the body, control means for energizing and deenergizing the motor and the brake to start and stop the movable body, a first retardation rate controlled element operable in accordance with movements of said body, an auxiliary brake releasing means responsive to operation of said first retardation element for increasing or decreasing the application of the brake while the body is decelerating, a second retardation rate controlled element operable in accordance with movements of said body, and means responsive to operation of said second retardation element at a rate below a predetermined value for rendering ineffective the auxiliary brake releasing means until the body stops and thereby insure full application of the brake until the body stops.

10. In a control system for a movable body, a motor, an electromechanical brake for decelerating and stopping the body, control means for energizing and deenergizing the motor and the brake to start and stop the movable body, a first retardation rate controlled element operable in accordance with movements of said body, an auxiliary brake releasing means responsive to operation of said first retardation element for increasing or decreasing the application of the brake while the body is decelerating, a second retardation rate controlled element operable in accordance with movements of said body, said second retardation element including a self-holding circuit, and means responsive to operation of said second retardation element at a rate below a predetermined value for rendering ineffective the auxiliary brake releasing means and for opening said self-holding circuit to make full application of the brake until the body stops.

WILLIAM F. EAMES.